United States Patent
Zumkeller et al.

(10) Patent No.: US 7,155,189 B2
(45) Date of Patent: Dec. 26, 2006

(54) AM RECEIVER

(75) Inventors: Markus Zumkeller, Schwaikheim (DE); Carsten Merkle, Welzheim (DE)

(73) Assignee: Sony Deutschland GmbH, Cologne (DE)

( * ) Notice: Subject to any disclaimer, the term of this patent is extended or adjusted under 35 U.S.C. 154(b) by 599 days.

(21) Appl. No.: 09/855,422

(22) Filed: May 15, 2001

(65) Prior Publication Data

US 2001/0044288 A1 Nov. 22, 2001

(30) Foreign Application Priority Data

May 17, 2000 (EP) .................................. 00110526

(51) Int. Cl.
*H04B 1/06* (2006.01)

(52) U.S. Cl. .................. 455/260; 455/313; 455/192.1; 375/344

(58) Field of Classification Search ............... 455/266, 455/67.13, 191.1, 313–334, 307, 188.1, 205, 455/143, 226.2, 203, 257, 258, 234.1, 234.2, 455/296, 306, 255, 142, 285, 260, 268, 192.1, 455/196.1, 220; 375/344, 332
See application file for complete search history.

(56) References Cited

U.S. PATENT DOCUMENTS

| | | | | |
|---|---|---|---|---|
| 2,813,974 A | * | 11/1957 | Oswold | 455/266 |
| 3,204,185 A | * | 8/1965 | Robinson | 455/265 |
| 4,112,375 A | * | 9/1978 | Schittko et al. | 455/316 |
| 4,115,737 A | * | 9/1978 | Hongu et al. | 455/285 |
| 4,206,410 A | * | 6/1980 | Ito et al. | 455/203 |
| 4,267,601 A | * | 5/1981 | Umeda et al. | 455/192.1 |
| 4,288,875 A | * | 9/1981 | Carter | 455/318 |
| 4,509,206 A | * | 4/1985 | Carpe et al. | 455/234.2 |
| 4,715,001 A | * | 12/1987 | Deem et al. | 455/265 |
| 4,856,085 A | * | 8/1989 | Horvat | 455/315 |
| 5,097,221 A | | 3/1992 | Miller | |
| 5,305,347 A | * | 4/1994 | Roschmann et al. | 455/67.13 |
| 5,802,462 A | * | 9/1998 | Lautzenhiser | 455/260 |
| 5,852,772 A | * | 12/1998 | Lampe et al. | 455/226.2 |
| 5,970,400 A | * | 10/1999 | Dwyer | 455/266 |
| 6,088,569 A | * | 7/2000 | Bach et al. | 455/307 |
| 6,125,267 A | * | 9/2000 | Monge-Navarro et al. | 455/192.1 |
| 6,317,589 B1 | * | 11/2001 | Nash | 455/226.2 |
| 6,363,126 B1 | * | 3/2002 | Furukawa et al. | 375/344 |
| 6,374,093 B1 | * | 4/2002 | Pesola | 455/188.1 |
| 6,385,262 B1 | * | 5/2002 | Gustafsson et al. | 375/350 |
| 6,456,079 B1 | * | 9/2002 | Ott et al. | 324/327 |

(Continued)

FOREIGN PATENT DOCUMENTS

EP 0 966 120 12/1999

OTHER PUBLICATIONS

Patent Abstracts of Japan, vol. 014, No. 511, Aug. 24, 1990. JP 02 213228.

*Primary Examiner*—Lana Le
(74) *Attorney, Agent, or Firm*—Oblon, Spivak, McClelland, Maier & Neustadt, P.C.

(57) ABSTRACT

An AM receiver with at least one IF filter with a fixed IF bandwidth comprises at least one downconversion stage (3, 4, 5) to shift the signal input thereto into an IF range (IF1) having a variable oscillation frequency ($f_{LO1}$) which is adjustable to detune a wanted center frequency ($f_{C1}$) of a wanted signal part (30) from a center frequency ($f_{IF1}$) of the at least one IF filter so that an unwanted signal part (31b) adjacent to the wanted signal part (30) lies outside the fixed IF bandwidth.

44 Claims, 3 Drawing Sheets

U.S. PATENT DOCUMENTS

| | | | |
|---|---|---|---|
| 6,549,766 B1 * | 4/2003 | Vorenkamp et al. | 455/307 |
| 6,683,919 B1 * | 1/2004 | Olgaard et al. | 455/296 |
| 6,724,440 B1 * | 4/2004 | Suan et al. | 455/260 |
| 6,785,527 B1 * | 8/2004 | Earls | 455/323 |
| 6,980,609 B1 * | 12/2005 | Ahn | 375/344 |
| 2002/0081988 A1 * | 6/2002 | Parker | 455/313 |
| 2005/0156675 A1 * | 7/2005 | Rohde et al. | 455/313 |
| 2005/0275479 A1 * | 12/2005 | Sutton | 455/255 |
| 2006/0057996 A1 * | 3/2006 | Petrovic et al. | 455/260 |

* cited by examiner

AM RECEIVER

The present invention relates to an AM receiver and a method of receiving and processing AM signals, in particular to such AM receivers which comprise an IF filter with a fixed IF bandwidth such as shortwave AM receivers with analog IF filters, in particular receivers for the Digital Radio Mondial (DRM) system.

In the DRM system an IF bandwidth of 20 kHz is mandatory for receivers. Therefore, the analog IF filters within a receiver must have a 20 kHz bandwidth. On the other hand, a DRM signal and the existing analog signal which should also be processable in a DRM receiver might also have only a useful bandwidth of 10 kHz or even less, like in case of the existing analog AM signal.

A problem raises if adjacent to such a wanted signal having a smaller bandwidth than the analog IF filters in a receiver an unwanted signal occurs, in particular if such a signal has a high level, since this signal which will not be suppressed by the analog IF filter leads to a wrong setting of the amplification factor of the following automatic gain control (AGC) circuit and therewith a desired resolution of the wanted signal part can not be obtained during an A/D-conversion which is performed after the AGC and before the digital baseband processing.

FIG. 3 shows such an AM signal and characteristics of the IF analog filters for two different IF frequencies, namely $f_{IF1}$ as center frequency of a first analog filter which is obtained after a first downconversion from RF to IF1 and $f_{IF2}$ as center frequency of a second analog filter which is obtained by a second downconversion from IF1 to IF2.

The left hand side of FIG. 3 shows the signal after the first downconversion. It is shown that the first IF analog filter has a passband of 20 kHz, i. e. the passband of the first IF analog filter has the range of $f_{IF1}$−10 kHz to $f_{IF1}$+10 kHz. The AM signal which is downconverted to IF1 comprises a wanted signal part 30 having a bandwidth of 10 kHz and a center frequency $f_C=f_{IF1}$, i. e. the frequency range of the AM signal in the first IF stage is $f_{IF1}$−5 kHZ to $f_{IF1}$+5 kHz. Adjacent to this wanted signal part 30 are unwanted signal parts 31a, 31b having smaller, equal or higher levels in comparison to the wanted signal part 30. In particular a low frequency low level unwanted signal part 31a and a high frequency high level unwanted signal part 31b are shown. These unwanted signal parts 31a, 31b lie within and outside the passband of the first IF analog filter.

The same is shown in the right hand side of FIG. 3 for the second IF stage with the center frequency $f_C$ of the wanted signal part 30 equal to $f_{IF2}$, the bandwidth of the wanted signal part 30 equal to 10 kHz, namely from $f_{IF2}$−5 kHz to $f_{IF2}$+5 kHz and a 20 kHz bandwidth of the second IF analog filter, namely from $f_{IF2}$−10 kHz to $f_{IF2}$+10 kHz. Also in this case the unwanted signal parts 31a, 31b lie adjacent to the wanted signal part 30 and have respective levels below, equal to and higher than the level of the wanted signal part 30.

In such a constellation that a high level unwanted signal part 31b occurs adjacent to the small bandwidth wanted signal part 30 the energy of the wanted signal after an automatic gain control stage arranged behind the second IF analog filter might be much lower than without the unwanted signal part 31b at the input of a following A/D-converter.

To cope with this problem, either the resolution or the sampling clock of the A/D-converter must be increased so that within the following digital baseband processing a desired resolution of the wanted signal part can be achieved which leads to a higher cost for the realization of the receiver.

It is the object underlying the present invention to provide an improved AM receiver and method for receiving/processing an AM signal.

This object is solved by an AM receiver according to independent claim 1 and a method to receive/process an AM signal according to independent claim 9. Respective preferred embodiments thereof are defined in the following dependent subclaims, respectively.

According to a preferred embodiment of the present invention the frequency of the first downconverter which shifts the center frequency of the wanted signal part from RF to the first IF frequency IF1 is detuned in a way that a e.g. high level unwanted adjacent signal part lies outside the range of the first analog IF filter which is arranged behind said first downconverter.

Therewith, according to the preferred embodiment of the present invention the first downconverter cuts-off an unwanted signal part adjacent to the wanted signal part and based on the obtained signal the following AGC stage automatically sets a correct amplification factor so that the desired resolution of wanted signal part can be obtained during the A/D conversion.

The re-adjusting of the original center frequency can be done in the digital baseband processing or during the second down conversion to the second IF frequency IF2.

The best setting for such a "variable" first intermediate frequency IF1 can be obtained by analyzing the power of the FFT carriers outside the wanted signal part or by BER (Bit Error Rate) fine tuning in the digital baseband processing or by optimizing the AGC control voltage.

Of course, such a detuning can also be performed during the second downconversion or during the first and the second downconversion. In the latter case it is also possible to cut-off unwanted signal parts on both sides of the wanted signal. In both cases the re-adjusting of the original center frequency has to be done in the digital baseband processing.

In the following the present invention is illucidated by an exemplary embodiment thereof with reference to the accompanying drawings, wherein FIG. 1 shows a DRM-receiver according to the present invention;

Figure 1:
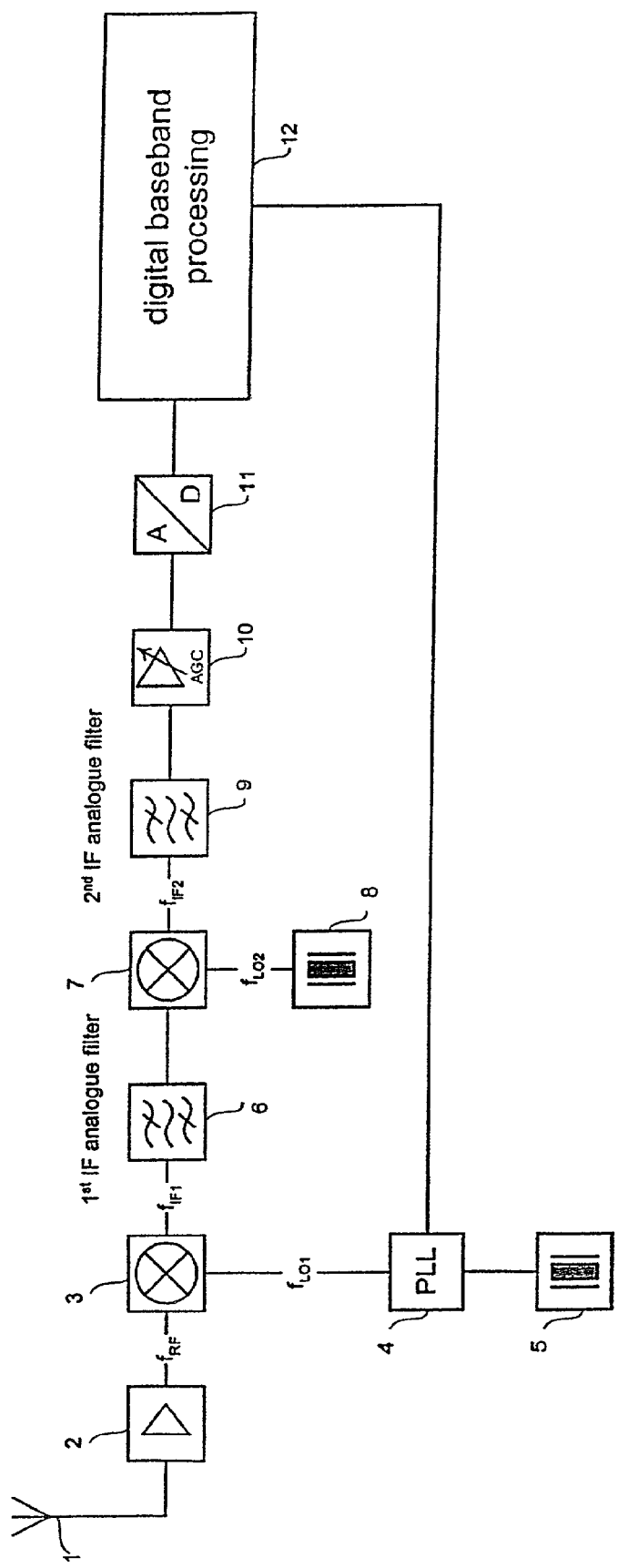

FIG. 1 shows a DRM-receiver according to the present invention. An AM signal is received by an antenna 1 and after amplification 2 the AM signal having a wanted signal part 30 with a center frequency $f_{RF}$ gets downconverted by a first downconverter 3 so that the center frequency of the wanted signal part equals to $f_{IF1}$, namely to the first intermediate frequency IF1. After passing through a first IF analog filter 6 the received and downconverted AM signal gets further downconverted by a second downconverter 7 so that the center frequency $f_{C2}$ of the wanted signal part equals to $f_{IF2}$, namely to the second intermediate frequency IF2. The resulting signal is filtered in a second IF analog filter 9 before amplification in an automatic gain control unit 10, A/D-conversion by an A/D-converter 11 and a following digital baseband processing 12. Basically, this processing is in conformity with that of a conventional DRM receiver.

However, according to the described preferred embodiment of the present invention the first intermediate frequency $f_{IF1}$ is not fixed like in the receiver according to the prior art, but can be detuned from the possible frequency of 10,7 MHz so that a high frequency high level unwanted signal part 31b or a low frequency low level unwanted signal part 31a within the AM signal lies outside the filter range of the first IF analog filter 6. Therefore, according to the preferred embodiment of the present invention a PLL circuit 4 adjusts the output frequency of a first fixed oscillator 5 so that its output frequency $f_{LO1}$ which is input to the first down-converter 3 determines the appropriate first intermediate frequency $f_{IF1}$ based on a control signal which is supplied from the digital baseband processing stage 12.

The detuning of the first intermediate frequency gets corrected during the digital baseband processing 12. Therefore, the downconversion to the second intermediate frequency, the second analog filtering, the automatic gain control and the A/D-conversion in-between the first intermediate frequency filering 6 and the digital baseband processing 12 is performed like in the DRM-receiver according to the prior art. Since according to the shown preferred embodiment of the present invention the first IF analog filter 6 cuts-off the high frequency high level unwanted signal part 31b and the low frequency unwanted signal part 31a basically has a level equal to the level of the wanted signal part 30, the energy of the wanted signal part 30 after the AGC 10 has an appropriate level and is not lowered or raised due to unwanted signal parts 31a, 31b with a level deviating from that of the wanted signal part 30.

As is apparent from the foregoing description, the first intermediate frequency $f_{IF1}$ can be detuned to either be higher or lower than the first intermediate frequency in a DRM-receiver according to the prior art so that a high or low level unwanted signal part 31a, 31b adjacent to the wanted signal part 30 lying on either one side of the wanted signal part 30 can be cut-off.

However, if the second intermediate frequency $f_{IF2}$ is also made variable by a second PLL circuit receiving the output frequency $f_{LO2}$ of the second fixed oscillator 8 and supplying it to the second down-converter 7 it is also possible to cut-off unwanted signal parts on both sides of a wanted signal part, e.g. the low frequency unwanted signal part 31a can also be cut-off, in this case by the second IF analog filter 9.

Alternatively, in this case, the second down-converter 7 can also be used to set the predetermined second IF frequency $f_{IF2}$ to the same frequency as used in the DRM-receiver according to the prior art. In this case no frequency correction has to be performed during the digital baseband processing 12.

Figure 2:
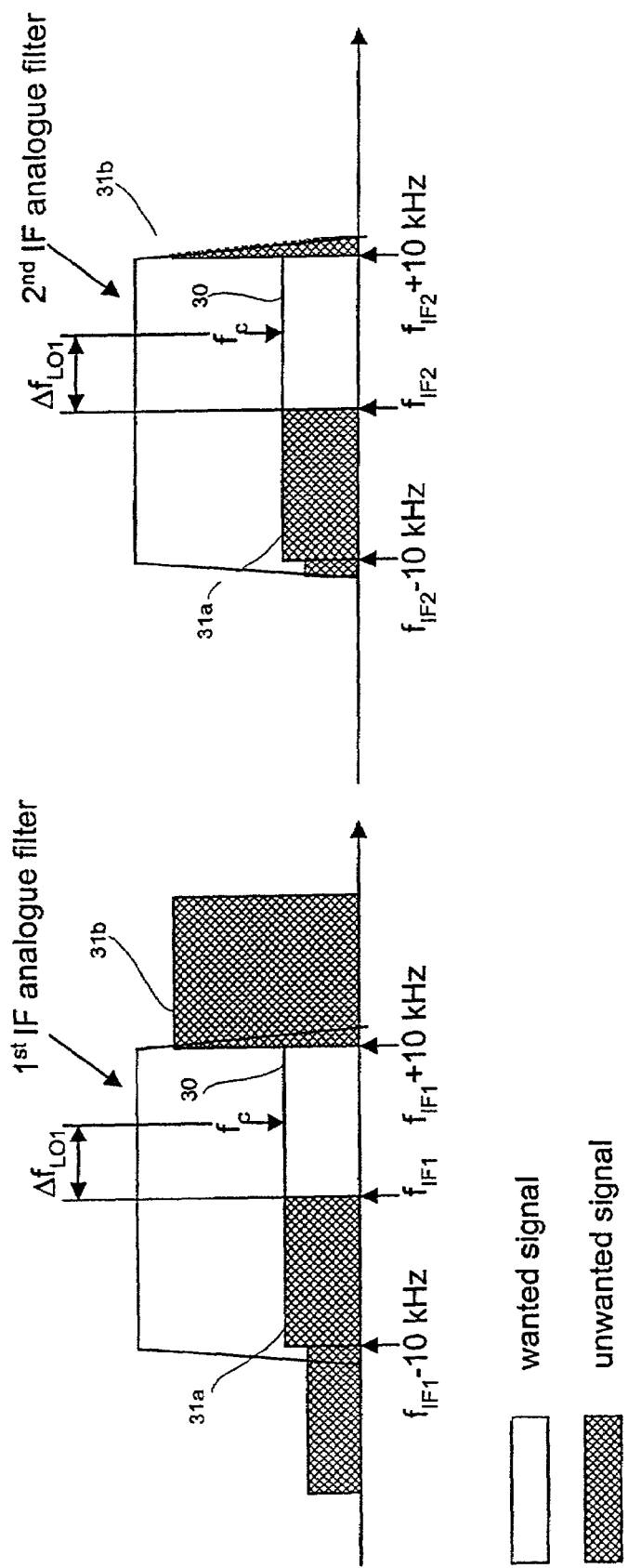
FIG. 2 shows IF signals in the receiver shown in FIG. 1.
Figure 3:
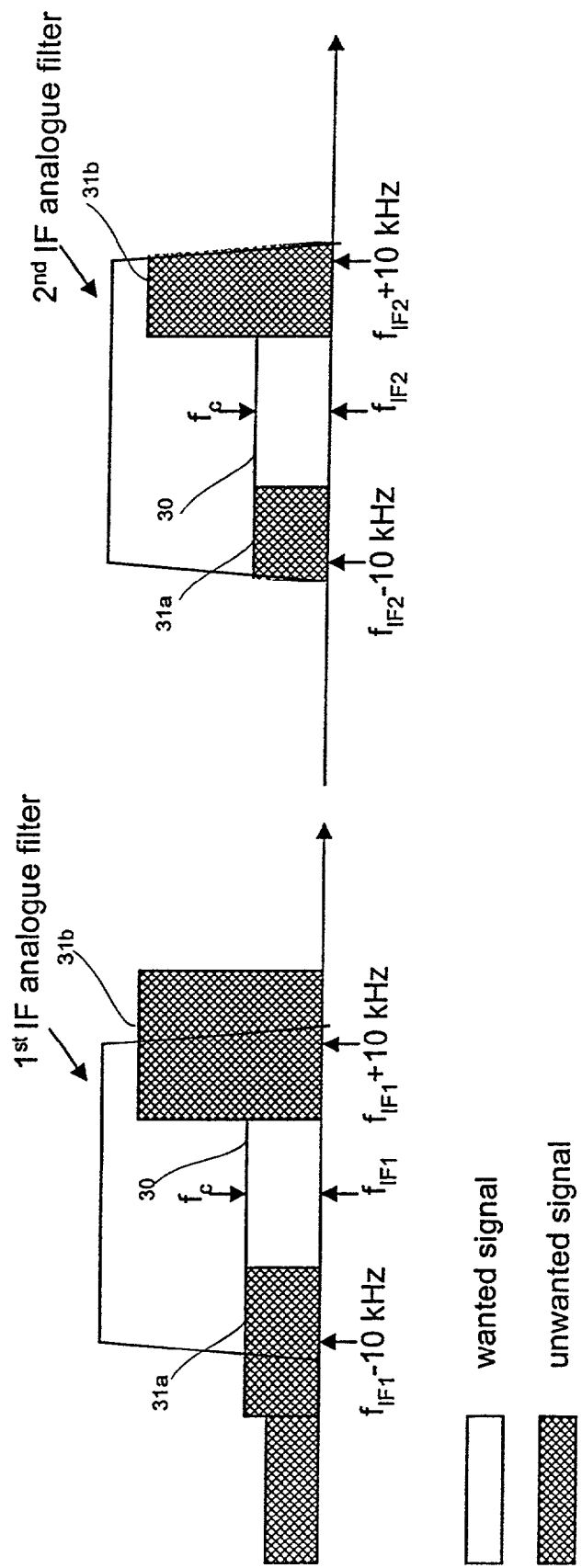
FIG. 3 shows IF signals in a receiver according to the prior art.

FIG. 2 shows the downconverted AM signal in the first and second IF stages together with the filter characteristics of the first and second IF analog filters 6 and 9. In comparison to FIG. 3 the center frequency $f_{C1}$ of the wanted signal part 30 is not set to $f_{IF1}$ which is the center frequency of the first IF analog filter 6, but offset by $\Delta f_{LO1}$ therefrom so that the high frequency high level unwanted signal part 31b is shifted to have a higher frequency to lie substantially outside the passband of the first IF analog filter 6. Since this high level high frequency unwanted signal part 31b is cut-off by the first IF analog filter 6 the automatic gain control 10 can shift the level of the wanted signal part 30 to an appropriate level for the following A/D-conversion 11. Further, since in this embodiment the second down-converter 7 is triggered by the second fixed oscillator 8 directly no further frequency shift is introduced and the center frequency $f_{C2}$ of the wanted signal part 30 in the second IF stage is offset from the center frequency $f_{IF2}$ of the second IF analog filter 9 also by $\Delta f_{LO1}$.

As discussed above, since the high level high frequency unwanted signal part 31b is substantially cut-off by the first IF analog filter 6 the center frequency $f_{C2}$ of the wanted signal part 30 could be shifted to the appropriate second intermediate frequency $f_{IF2}$ or further be offset to the low frequency side to cut-off the low frequency low level unwanted signal part 31a.

The invention claimed is:

1. An AM receiver, comprising:
   at least one IF filter with a fixed IF bandwidth; and
   at least one down-conversion stage to shift the signal input thereto into an IF range,
   wherein said at least one down-conversion stage has a variable oscillation frequency which is adjustable to detune a wanted center frequency of a wanted signal part from a center frequency of said at least one IF filter so that an unwanted signal part adjacent to said wanted signal part lies outside said fixed IF bandwidth, and
   said AM receiver is configured and adapted for adjusting said variable oscillation frequency on the basis of a feedback signal supplied downstream from said down-conversion stage in order to shift said wanted center frequency toward a higher frequency within a passband of said at least one IF filter so as to have more of a higher frequency unwanted signal part to lie substantially outside the passband of the IF filter.

2. The AM receiver according to claim 1, wherein said AM receiver is configured and adapted for detecting said unwanted signal part by:
   analyzing the power of FFT carriers outside the wanted signal part; or
   bit error rate fine tuning in a digital baseband processing; or optimizing an automatic gain control voltage.

3. The AM receiver according to claim 1, further comprising a baseband processing stage which readjusts the detuned IF signal to a predetermined center frequency.

4. The AM receiver according to claim 3, wherein said baseband processing stage performs digital operations.

5. The AM receiver according to claim 3, comprising
   a PLL circuit for adjusting said variable oscillation frequency,
   wherein said baseband processing stage supplies said feedback signal to said PILL circuit.

6. The AM receiver according to claim 1, wherein said at least one down-conversion stage detunes the IF signal and readjusts the detuned IF signal to a predetermined center frequency.

7. The AM receiver according to claim 1, wherein the AM receiver is a digital shortwave receiver.

8. The AM receiver according the claim 7, wherein the digital shortwave receiver is a Digital Radio Mondial receiver.

9. The AM receiver according to claim 1, wherein said at least one IF filter is an analog filter.

10. The AM receiver according to claim 1, wherein said fixed IF bandwidth is 20 kHz.

11. A method to process a received and optionally processed AM signal, comprising the steps of
    detuning, by means of a down conversion stage, a wanted center frequency of a wanted signal part from a center frequency used during at least one IF filtering with a fixed IF bandwidth so that an unwanted signal part adjacent to said wanted signal part lies outside said fixed IF bandwidth; and
    adjusting, on the basis of a feedback signal obtained downstream from said down-conversion stage, a frequency to which said wanted center frequency is detuned, such that said wanted center frequency is shifted toward a higher frequency within a passband of said fixed IF bandwidth to have more of a higher frequency unwanted signal part to lie substantially outside the passband of the IF filter.

12. The method according to claim 11, comprising the step of detecting said unwanted signal part by:
analyzing the power of FFT carriers outside the wanted signal part; or
bit error rate fine tuning in a digital baseband processing; or
optimizing an automatic gain control voltage.

13. The method according to claim 11, further comprising the step of readjusting the detuned IF signal to a predetermined center frequency after said at least one IF filtering.

14. The method according to claim 11, used for digital shortwave reception.

15. The method according to claim 14, used for Digital Radio Mondial reception.

16. An AM receiver comprising:
an IF filter having a fixed bandwidth and a predetermined center frequency;
a down-conversion stage, arranged upstream from said IF filter, configured and adapted to receive an input signal having a desired signal component having a center frequency; and
a feedback path for supplying a control signal to said down-conversion stage on the basis of a feedback signal obtained downstream from said down-conversion stage,
wherein said AM receiver is configured and adapted for shifting, by means of said down-conversion stage, said input signal into an IF range on the basis of said control signal such that said center frequency of said shifted input signal is detuned from said center frequency of said IF filter in order to shift said wanted center frequency toward a higher frequency within a passband of said at least one IF filter so as to have more of a higher frequency unwanted signal part to lie substantially outside the passband of the IF filter.

17. The AM receiver of claim 16, wherein said AM receiver is configured and adapted for setting said detuned center frequency to a first center frequency and for determining said first center frequency by:
analyzing the power of FFT carriers outside the wanted signal part; or
bit error rate fine tuning in a digital baseband processing; or
optimizing an automatic gain control voltage.

18. The AM receiver of claim 16, further comprising a baseband processing stage, arranged downstream from said IF filter, configured and adapted to shift said detuned input signal to said center frequency of said IF filter.

19. The AM receiver of claim 18,
wherein said feedback path comprises a PLL circuit for supplying said control signal, and
said baseband processing stage supplies said feedback signal to said PLL circuit.

20. An AM receiver comprising:
an IF filter having a fixed bandwidth;
a down-conversion stage, arranged upstream from said IF filter, configured and adapted to receive an input signal having a desired signal component and an undesired signal component adjacent said desired signal component in the frequency domain; and a feedback path for supplying a control signal to said down-conversion stage on the basis of a feedback signal obtained downstream from said down-conversion stage,
wherein said AM receiver is configured and adapted for shifting, by means of said down-conversion stage, said input signal into an IF range on the basis of said control signal such that said undesired signal component lies at least partially outside said bandwidth of said IF filter, such that said wanted center frequency is shifted toward a higher frequency within a passband of said IF filter to have more of a higher frequency unwanted signal part to lie substantially outside the passband of the IF filter.

21. The AM receiver of claim 20, wherein said AM receiver is configured and adapted for detecting said undesired signal component by:
analyzing the power of FFT carriers outside the wanted signal part; or
bit error rate fine tuning in a digital baseband processing; or
optimizing an automatic gain control voltage.

22. The AM receiver of claim 20,
wherein said IF filter has a predetermined center frequency,
said desired signal component has a center frequency, and
said AM receiver is configured and adapted for shifting, by means of said down-conversion stage, said input signal into said IF range such that said center frequency of said shifted input signal is detuned from said center frequency of said IF filter.

23. An AM receiver, comprising:
at least one IF filter with a fixed IF bandwidth; and
at least one down-conversion stage to shift the signal input thereto into an IF range,
wherein said at least one down-conversion stage has a variable oscillation frequency which is adjustable to detune a wanted center frequency of a wanted signal part from a center frequency of said at least one IF filter so that an unwanted signal part adjacent to said wanted signal part lies outside said fixed IF bandwidth, and
said AM receiver is configured and adapted for adjusting said variable oscillation frequency on the basis of a feedback signal supplied downstream from said down-conversion stage in order to shift said wanted center frequency toward a higher or lower edge of the passband of said at least one IF filter so as to have more of a higher frequency unwanted signal part to lie substantially outside the passband of the IF filter.

24. The AM receiver according to claim 23, wherein said AM receiver is configured and adapted for detecting said unwanted signal part by:
analyzing the power of FFT carriers outside the wanted signal part; or
bit error rate fine tuning in a digital baseband processing; or optimizing an automatic gain control voltage.

25. The AM receiver according to claim 23, further comprising a baseband processing stage which readjusts the detuned IF signal to a predetermined center frequency.

26. The AM receiver according to claim 25, wherein said baseband processing stage performs digital operations.

27. The AM receiver according to claim 25, comprising a PLL circuit for adjusting said variable oscillation frequency,
wherein said baseband processing stage supplies said feedback signal to said PILL circuit.

28. The AM receiver according to claim 23, wherein said at least one down-conversion stage detunes the IF signal and readjusts the detuned IF signal to a predetermined center frequency.

29. The AM receiver according to claim 23, wherein the AM receiver is a digital shortwave receiver.

30. The AM receiver according the claim 29, wherein the digital shortwave receiver is a Digital Radio Mondial receiver.

31. The AM receiver according to claim 23, wherein said at least one IF filter is an analog filter.

32. The AM receiver according to claim 23, wherein said fixed IF bandwidth is 20 kHz.

33. A method to process a received and optionally processed AM signal, comprising the steps of
   detuning, by means of a down conversion stage, a wanted center frequency of a wanted signal part from a center frequency toward a higher or lower edge of the passband of said at least one IF bandwidth so that an unwanted signal part adjacent to said wanted signal part lies outside said fixed IF bandwidth; and
   adjusting, on the basis of a feedback signal obtained downstream from said down-conversion stage, a frequency to which said wanted center frequency is detuned, such that said wanted center frequency is shifted toward a higher frequency within a passband of said fixed IF bandwidth to have more of a higher frequency unwanted signal part to lie substantially outside the passband of the IF filter.

34. The method according to claim 33, comprising the step of detecting said unwanted signal part by:
   analyzing the power of FFT carriers outside the wanted signal part; or
   bit error rate fine tuning in a digital baseband processing; or
   optimizing an automatic gain control voltage.

35. The method according to claim 33, further comprising the step of readjusting the detuned IF signal to a predetermined center frequency after said at least one IF filtering.

36. The method according to claim 33, used for digital shortwave reception.

37. The method according to claim 36, used for Digital Radio Mondial reception.

38. An AM receiver comprising:
   an IF filter having a fixed bandwidth and a predetermined center frequency;
   a down-conversion stage, arranged upstream from said IF filter, configured and adapted to receive an input signal having a desired signal component having a center frequency; and
   a feedback path for supplying a control signal to said down-conversion stage on the basis of a feedback signal obtained downstream from said down-conversion stage,
   wherein said AM receiver is configured and adapted for shifting, by means of said down-conversion stage, said input signal into an IF range on the basis of said control signal such that said center frequency of said shifted input signal is detuned from said center frequency of said IF filter in order to shift said wanted center frequency toward a higher frequency within a passband of said at least one IF filter so as to have more of a higher frequency unwanted signal part to lie substantially outside the passband of the IF filter.

39. The AM receiver of claim 38, wherein said AM receiver is configured and adapted for setting said detuned center frequency to a first center frequency and for determining said first center frequency by:
   analyzing the power of FFT carriers outside the wanted signal part; or
   bit error rate fine tuning in a digital baseband processing; or
   optimizing an automatic gain control voltage.

40. The AM receiver of claim 38, further comprising a baseband processing stage, arranged downstream from said IF filter, configured and adapted to shift said detuned input signal to said center frequency of said IF filter.

41. The AM receiver of claim 40,
   wherein said feedback path comprises a PLL circuit for supplying said control signal, and
   said baseband processing stage supplies said feedback signal to said PLL circuit.

42. An AM receiver comprising:
   an IF filter having a fixed bandwidth;
   a down-conversion stage, arranged upstream from said IF filter, configured and adapted to receive an input signal having a desired signal component and an undesired signal component adjacent said desired signal component in the frequency domain; and
   a feedback path for supplying a control signal to said down-conversion stage on the basis of a feedback signal obtained downstream from said down-conversion stage,
   wherein said AM receiver is configured and adapted for shifting, by means of said down-conversion stage, said input signal into an IF range on the basis of said control signal such that said undesired signal component lies at least partially outside said bandwidth of said IF filter, such that said wanted center frequency toward a higher or lower edge of the passband of said at least one IF filter signal to have more of a higher frequency unwanted signal part to lie substantially outside the passband of the IF filter.

43. The AM receiver of claim 42, wherein said AM receiver is configured and adapted for detecting said undesired signal component by:
   analyzing the power of FFT carriers outside the wanted signal part; or
   bit error rate fine tuning in a digital baseband processing; or
   optimizing an automatic gain control voltage.

44. The AM receiver of claim 42,
   wherein said IF filter has a predetermined center frequency,
   said desired signal component has a center frequency, and
   said AM receiver is configured and adapted for shifting, by means of said down-conversion stage, said input signal into said IF range such that said center frequency of said shifted input signal is detuned from said center frequency of said IF filter.

* * * * *